(12) United States Patent
Noé et al.

(10) Patent No.: US 8,109,428 B2
(45) Date of Patent: Feb. 7, 2012

(54) METHOD OF AND APPARATUS FOR SPLICING METAL STRIPS

(75) Inventors: Andreas Noé, Kerken (DE); Dieter Baukloh, Duisburg (DE); Friedhelm Ambaum, Duisburg (DE); Stefan Sonntag, Duisburg (DE)

(73) Assignee: BWG Bergwerk-und Walzwerk-Maschinenbau GmbH USA

( * ) Notice: Subject to any disclaimer, the term of this patent is extended or adjusted under 35 U.S.C. 154(b) by 0 days.

(21) Appl. No.: 12/644,082

(22) Filed: Dec. 22, 2009

(65) Prior Publication Data

US 2010/0163604 A1 Jul. 1, 2010

(30) Foreign Application Priority Data

Dec. 29, 2008 (DE) .................... 10 2008 063 277

(51) Int. Cl.
*B23K 20/12* (2006.01)
*B23K 37/04* (2006.01)
(52) U.S. Cl. .......... 228/2.1; 228/43; 228/44.3; 228/49.4
(58) Field of Classification Search ........................ None
See application file for complete search history.

(56) References Cited

U.S. PATENT DOCUMENTS

| | | | | |
|---|---|---|---|---|
| 3,039,333 A * | 6/1962 | Jones et al. ................. | 228/1.1 |
| 3,146,333 A * | 8/1964 | Cooper et al. .................. | 219/80 |
| 3,286,342 A * | 11/1966 | Seeloff et al. .................. | 228/170 |
| 3,670,398 A * | 6/1972 | Minton ............................. | 29/505 |
| 4,063,061 A * | 12/1977 | Fujino et al. ................. | 219/101 |
| 4,067,489 A * | 1/1978 | Ishioka et al. ................. | 228/5.7 |
| 4,286,744 A * | 9/1981 | Gullotti et al. ................. | 228/125 |
| 4,490,199 A * | 12/1984 | Dunning ....................... | 156/73.4 |
| 4,916,284 A * | 4/1990 | Petrick ..................... | 219/121.64 |
| 4,973,089 A * | 11/1990 | Wheeler et al. ............... | 228/170 |
| 5,098,005 A * | 3/1992 | Jack ............................... | 228/4.1 |
| 5,234,154 A * | 8/1993 | Kajiwara et al. .............. | 228/158 |
| 5,276,304 A * | 1/1994 | Sauvage et al. ........... | 219/121.63 |
| 5,605,275 A * | 2/1997 | Rintala ........................ | 228/49.4 |
| 5,720,425 A * | 2/1998 | Tazoe et al. .................... | 228/171 |
| 5,746,856 A * | 5/1998 | Hendershot et al. ......... | 156/73.4 |
| 5,871,137 A * | 2/1999 | Ege et al. ........................ | 228/5.7 |
| 5,880,424 A | 3/1999 | Katoh .......................... | 219/86.7 |
| 5,948,295 A * | 9/1999 | Perret et al. ................. | 219/125.1 |
| 6,070,781 A * | 6/2000 | Johnson et al. .............. | 228/49.4 |
| 6,161,752 A * | 12/2000 | Miyata et al. .................. | 228/160 |
| 6,189,763 B1 * | 2/2001 | Tazoe et al. ..................... | 228/5.7 |
| 6,213,381 B1 * | 4/2001 | Funamoto et al. .......... | 228/141.1 |
| 6,572,003 B2 * | 6/2003 | Miyata et al. ................. | 228/49.1 |
| 6,601,751 B2 | 8/2003 | Iwashita | |
| 6,722,556 B2 | 4/2004 | Schilling et al. ........... | 228/112.1 |
| 6,758,382 B1 * | 7/2004 | Carter ............................ | 228/2.1 |
| 6,759,622 B1 * | 7/2004 | Zinsen ........................ | 219/69.17 |
| 7,360,677 B2 * | 4/2008 | Gendou et al. ............. | 228/112.1 |

(Continued)

FOREIGN PATENT DOCUMENTS

JP 61176484 B 8/1986

(Continued)

*Primary Examiner* — Kiley Stoner
(74) *Attorney, Agent, or Firm* — Andrew Wilford

(57) ABSTRACT

A method of splicing a trailing end of a downstream metal strip to the leading end of an upstream metal strip. The method has the steps of overlapping the leading end of the upstream strip with the trailing end of the downstream strip, and thereafter friction welding the overlapping ends together at a plurality of spots at which respective spot welds are thereby formed.

11 Claims, 7 Drawing Sheets

U.S. PATENT DOCUMENTS

| | | | |
|---|---|---|---|
| 7,635,075 B2* | 12/2009 | Hirano et al. | 228/2.1 |
| 7,654,435 B2* | 2/2010 | Kumagai et al. | 228/112.1 |
| 7,698,797 B2* | 4/2010 | Hetrick et al. | 29/505 |
| 7,828,194 B2* | 11/2010 | Iimura et al. | 228/212 |
| 2002/0011469 A1* | 1/2002 | Miyata et al. | 219/82 |
| 2002/0121506 A1* | 9/2002 | Menin | 219/121.64 |
| 2002/0179682 A1* | 12/2002 | Schilling et al. | 228/112.1 |
| 2003/0015568 A1* | 1/2003 | Takeda et al. | 228/13 |
| 2004/0035852 A1* | 2/2004 | Kawamizu et al. | 219/546 |
| 2004/0079787 A1* | 4/2004 | Okamoto et al. | 228/112.1 |
| 2004/0195290 A1* | 10/2004 | Nagao | 228/2.1 |
| 2004/0211819 A1* | 10/2004 | Ezumi et al. | 228/112.1 |
| 2005/0189398 A1* | 9/2005 | Sato | 228/2.1 |
| 2006/0138197 A1 | 6/2006 | Aota | |
| 2006/0169741 A1* | 8/2006 | Smith et al. | 228/2.1 |
| 2006/0231594 A1* | 10/2006 | Murakawa et al. | 228/112.1 |
| 2006/0241163 A1* | 10/2006 | Okamoto et al. | 514/389 |
| 2006/0289604 A1* | 12/2006 | Zettler et al. | 228/2.1 |
| 2007/0029039 A1 | 2/2007 | Noe | 156/304.3 |
| 2008/0135601 A1* | 6/2008 | Chen et al. | 228/102 |
| 2008/0173695 A1* | 7/2008 | Nagao | 228/2.3 |
| 2008/0190992 A1* | 8/2008 | Jin | 228/44.3 |
| 2008/0223502 A1* | 9/2008 | Kawada | 156/73.4 |
| 2009/0032166 A1* | 2/2009 | Aoshima | 156/73.5 |
| 2009/0159639 A1* | 6/2009 | Fukuhara et al. | 228/2.1 |
| 2009/0200359 A1* | 8/2009 | Chen et al. | 228/112.1 |
| 2009/0294418 A1* | 12/2009 | Barjon et al. | 219/121.64 |
| 2009/0308913 A1* | 12/2009 | Hall et al. | 228/112.1 |
| 2010/0089977 A1* | 4/2010 | Chen et al. | 228/114.5 |
| 2010/0262110 A1* | 10/2010 | Lakso | 604/385.3 |

FOREIGN PATENT DOCUMENTS

| | | |
|---|---|---|
| JP | 2004276056 B | 10/2004 |
| JP | 2006000901 B | 1/2006 |

* cited by examiner

METHOD OF AND APPARATUS FOR SPLICING METAL STRIPS

FIELD OF THE INVENTION

The present invention relates to the end-to-end joining of metal strips. More particularly this invention concerns a method of and apparatus for splicing together metal strips for processing in a rolling mill.

BACKGROUND OF THE INVENTION

It is frequently necessary to join two metal strips together at the intake of a strip-treatment plant, that is a rolling mill, so that the mill can operate continuously and so that it is not necessary to rethread the strip through the mill each time a new strip is being processed. More particularly, coiled strips are generally unwound at the intake, then run through one or more processing stations, and at the outlet are optionally wound up again or alternatively also cut into plates. This way, the leading end of a new coil is spliced to the trailing end of the last coil so that the strips do not always have to be rethreaded. In this context it is known from practice to splice the metal strips to one another by welded joints.

With different types of metal strip and in particular metal strips of aluminum alloys, welded joints often cause problems in practice. For example, resistance spot welding with aluminum alloys causes the problem of spattering. Furthermore, there is the danger of the electrode adhering to the strip and minimum spacings between two adjacent spot welds are necessary due to the electrical connections. Some alloys cannot be welded at all by means of resistance spot welding. The same applies to resistance seam welding that likewise has the problem of spatter formation with aluminum alloys and otherwise has a low seam quality. Poor seam qualities also result with friction stir welding, in particular with small strip thicknesses.

For this reason, punched joints, also referred to as stitching, were also used as an alternative to welding and as a rule can be used up to a strip thickness of approximately 6 mm. The problem thereby is often the fact that in the course of punching burrs caused by the cutting gap of the two punching tools or chip particles that are loose or are still slightly spliced with the strips are produced. When the strips pass through a strip-processing line and run around processing line rollers in this joint, the burrs or chips can break off and adhere to the processing line rollers, particularly if these rollers are plastic-coated. In order to prevent this, it is basically known to adhere punched joints by means of adhesive tape (see for example US 2007/0029039). Otherwise, adhesive joints are also used in practice, but as a rule only up to a strip thickness of no more than 1 mm. In the case of greater strip thicknesses there is a danger that the adhesive seam will be sheared open in the strip-processing line while running around rollers due to the bending stiffness of the strips.

Finally, a spot-welding head for a strapping machine is known from U.S. Pat. No. 5,880,424, where in a strapping machine of this type, for example a steel strip coil, a wire coil, a group of pipes or rods or bars or a stack of plates is strapped with a steel strip. The overlapping sections of a steel strip of this type can be spliced to one another by means of spot welding.

OBJECTS OF THE INVENTION

It is therefore an object of the present invention to provide an improved method of and apparatus for splicing metal strips.

Another object is the provision of such an improved method of and apparatus for splicing metal strips that overcomes the above-given disadvantages, in particular that can be used universally for different metal alloys and in particular aluminum or aluminum alloys and in particular can be done without problematic burr formation.

SUMMARY OF THE INVENTION

A method of splicing a trailing end of a downstream metal strip to the leading end of an upstream metal strip. The method has according to the invention the steps of overlapping the leading end of the upstream strip with the trailing end of the downstream strip, and thereafter friction welding the overlapping ends together at a plurality of spots at which respective spot welds are thereby formed.

In friction spot welding, a spot weld is produced without adding material. The plasticizing of the material is produced by frictional heat of a rotating welding tool that bears on the metal strips with a defined pressure and penetrates into the metal strips so that a mixture of the material or the materials of the metal strips occurs. A conventional friction spot welding process can be used, in which a rotating tool, for example a rotating pin, acts on the strips. Particularly preferably the spot welds are made by means of friction spot welding with a welding head that has a rotating pin or pin-like projection and a rotating sleeve surrounding the pin or the pin-like projection, the pin and/or the sleeve locally plasticizing the trailing end and the leading end by rotation and the frictional heat produced thereby, whereby during welding the pin and the sleeve at least temporarily are displaced axially in opposite directions to one another. This technique of friction spot welding is basically known (see for example U.S. Pat. No. 6,722,556). In the variant of friction spot welding preferably used here with a rotating pin and/or rotating sleeve that are moved in the axial direction in opposite directions, and in which the pin and/or sleeve penetrate into the metal strips, the displaced material is prevented from flowing off into the surroundings in an uncontrolled manner and from thus no longer being available for producing the spot weld. All the plasticized material forms the spot weld. For example, that the rotating pin penetrates into the metal strips and at the same time the sleeve surrounding the pin is retracted so that the displaced material is retained in the immediate vicinity of the pin. When the desired axial penetration depth has been reached, the pin-like projection is moved back into the starting position and at the same time the sleeve is moved in the opposite direction so that the material is completely packed back in place. Conversely, it is also possible that initially the sleeve penetrates into the workpieces or strips and the pin is drawn out. This always ensures that in a first process step sufficient space is provided for the displaced material and that then in a second process step with the reverse direction of movement of pin and sleeve the plasticized material is pressed back into the weld region forming the spot weld. The fact is particularly important that with this process reliable spot welds are possible with a variety of metal alloys and in particular also with aluminum alloys. No burr formation or no appreciable burr formation occurs, so that excellent surfaces are produced that in particular do not cause any interference when passing through the strip-processing installation. The use of friction spot welding known per se in the course of splicing ends of metal strips is consequently particularly important within the scope of the invention. Surprisingly, strip welds of high quality and high strength can be produced that also withstand the high stresses in strip-processing installations.

Several spot welds spaced apart transversely of the strip-travel direction are made preferably at the same time or consecutively, forming a row of spot welds extending over the width of the strip. The strip width is generally more than 500 mm, preferably more than 1000 mm, for example more than 1500 mm. The spacing of two adjacent spot welds of a row of spot welds can be, for example 20 mm to 100 mm, preferably 30 mm to 70 mm. Overall, an excellent weld is produced over (virtually) the entire strip width. It can be advantageous if the spacing of two adjacent spot welds of a row of spot welds increases from the center of the strip to one strip edge or to the strip edges. The strength of the weld can thus be optimized with a given welding time. However, the invention also comprises embodiments in which the spacing of two adjacent spot welds is uniform over the width of the strip.

The strip weld can also be optimized in that several spot welds or in particular several rows of spot welds each with several spot welds are made offset one downstream of the other in the strip-travel direction.

Basically, it is possible to produce a strip weld with a single welding head. In this case it can be effective to move the welding head transversely of the strip-travel direction and/or in the strip-travel direction, in order to place several spot welds one after the other. Preferably, however, several spot welds are made simultaneously with several welding heads spaced transversely of the strip-travel direction, so that the total welding time is reduced. With an embodiment of this type it is also useful, however, if these welding heads can be moved transversely of the strip-travel direction and/or in the strip-travel direction, in order to be able to produce a strip weld that has more spot welds than welding heads. Based on a strip width of, for example 2000 mm, and if a spacing of the spot welds of, for example 50 mm is assumed, 40 spot welds are made. With an individual welding time of, for example 5 seconds, this results in a total welding time of 200 seconds if work is carried out with only one welding head. If instead work is carried out with five welding heads, the total welding time is reduced to 40 seconds.

It is always advantageous if the trailing end and/or the leading end are fixed by means of one or more clamps or strip clamps during welding. It is basically possible to work with a single strip clamp provided in the overlapping region for at the same time fixing the trailing end of the downstream metal strip and the leading end of the upstream metal strip. Particularly preferably, however, the invention proposes the use of at least two strip clamps, namely an upstream strip clamp and a downstream strip clamp. The upstream strip clamp is thereby preferably provided upstream of the welding heads by a predetermined spacing. It preferably fixes only the leading end of the upstream metal strip. The downstream strip clamp can be provided approximately in the region of the welding heads and fix the trailing end of the downstream metal strip as well as the leading end of the upstream metal strip. It is advantageous thereby if the leading end of the upstream metal strip can be positioned relative to the trailing end of the downstream metal strip transversely of the strip-travel direction so that the leading end preferably can be centered with respect to the trailing end. To this end, the invention proposes in a preferred further development that the leading end of the upstream metal strip can be positioned with a clamp that can be moved transversely of the strip-travel direction. Optionally or additionally there is also the possibility that the trailing end is positioned, for example centered, relative to the leading end with a downstream strip clamp that fixes only the trailing end of the downstream strip. Otherwise, the invention also includes embodiments without strip clamps.

Otherwise, it can also be advantageous to splice the trailing end and the leading end to one another adhesively before welding, for example to adhere them to one another. A particularly tight seam, for example, can be produced this way so that the penetration of moisture inside the strip-processing line is prevented. Moreover, the number of spot welds can optionally be reduced by use of an adhesive without the strength of the weld being reduced.

Within the scope of the invention it is basically possible in the overlapping region to place the leading end of the upstream metal strip on the trailing end of the downstream metal strip or vice versa to place the trailing end of the downstream metal strip on the leading end of the upstream strip. If the downstream metal strip and the upstream metal strip have the same thickness and are composed of the same material, these two possibilities exist equally side by side. If in particular strips of different thickness are spliced to one another, it is basically possible to place the metal strip with lesser thickness on top of the metal strip with greater thickness. Particularly preferably, however, the invention proposes that, in cases of different strip thicknesses, the metal strip with greater thickness be positioned on the side facing toward the welding head, for example on the top of the metal strip with lower thickness. Tests have surprisingly shown that the shear tensile strength of the weld is much higher when the thicker trailing end is on top. This embodiment is therefore particularly important within the scope of the invention.

In a preferred further development of the invention it is proposed that the spot welds are smoothed after welding with a sanding process. Although the welding process according to the invention is already characterized by a very low burr formation and basically relatively smooth surfaces are already produced in the course of welding, the surface quality can be further improved through the described sanding process. To this end, it can be effective when the particles ground off (welding burrs) are removed during the sanding process, for example by a suitable suctioning. Then overall a particularly strong strip weld with particularly high surface quality is then achieved that meets even high requirements. Optionally or also additionally, it is possible to splice the region of the strip connection and consequently the spot welds by means of adhesive tape, such as is described, for example in DE 10 2005 037 182. The top and/or the bottom of the strip weld can preferably be adhered by means of a respective adhesive tape piece. An approach of this type lends itself in particular when a sanding process is omitted. However, basically, a strip weld can also be adhesively spliced that has been previously subjected to a sanding process.

The subject matter of the invention is also a (welding) device for splicing a trailing end of a downstream metal strip to the leading end of an upstream metal strip, for example at the intake of a strip-processing installation according to a method of the type described. A welder of this type has at least one (machine) frame that has at least one cross bar extending transversely of the strip-travel direction across the metal strips and on which at least one friction spot-welding head is provided. This friction spot-welding head has at least one rotating pin or a pin-like projection and at least one also rotating sleeve, the pin and the sleeve being displaced axially oppositely to one another, the welding head having at least one control drive for pressing the welding head against the strips and optionally for the axial displacement of the pin and/or sleeve. In this respect, a friction spot-welding head of the known type can be used (see for example DE 199 55 737).

In order to render possible the fixing of the strips already described at the outset, the apparatus according to the invention preferably has at least one downstream strip clamp for fixing at least the trailing end of the downstream metal strip and/or at least one upstream strip clamp for fixing at least the leading end of the upstream metal strip. Strip clamps of this type, which can be embodied in a manner known per se as clamping beams or have a clamping beam, are spliced to one or more actuating elements or actuators. In this respect these can be, for example, hydraulic and/or pneumatic cylinder-piston arrangements or also electric motors.

The welder preferably has at least one height adjuster for raising and lowering the cross bar with the welding heads attached thereto and/or for raising and lowering the (individual) welding heads on the cross bar. These height adjusters have respective actuators or are actuators, for example cylinder-piston arrangements or more particularly hydraulic or pneumatic cylinder-piston arrangements. It is consequently within the scope of the invention that all of the welding heads are raised and lowered together for example with the cross bar. However, the welding heads are preferably attached to the cross bar such that they can also be raised and lowered individually. This raising and lowering of the welding heads primarily serves the moving of the welding heads from a normal position into a ready position for welding. In the normal position the welding heads are separated by an adequate spacing from the moving strip, for example at least 100 mm above the moving strip. In this normal position the strips run through the welder in normal operation (under tension). If a spot weld is then to be produced, the welding heads are lowered by the height adjuster or the height adjusters, namely into a ready position for welding that can be for example 20 mm above the trailing ends. This positioning is carried out in a position-controlled or path-controlled manner, either with the cross bar that can be raised and lowered or with individual welding heads that can be raised and lowered. For welding, the welding heads or the components of the welding heads (pin/sleeve) are then moved with a controlled force optionally with additional actuators in the manner known per se. The paths covered in the course of this adjustment lie in an order of magnitude of less than 30 mm, for example 0 mm to 25 mm.

According to a further proposal of the invention, the apparatus has several welding heads that are spaced along the cross bar transversely of the strip-travel direction. As already described, the necessary time for producing the entire strip weld for the entire strip width can thus be reduced, since several spot welds can be made at the same time. Basically, it is possible to space a plurality of spot welds over the entire width of the strip, so that the entire strip weld can be produced in a single welding process. To this end, as a rule relatively few welding heads are necessary. For this reason the invention proposes in a preferred embodiment that several are provided on the cross bar, which welding heads, however, can be moved with the cross bar or relative to the cross bar. To this end, in turn a suitable actuator is provided that can for example be an electric-motor drive.

In order to be able to place the strips one on top of the other in the weld region in a simple manner, the invention proposes based on a preferred further development that at least one lifter is provided for the leading end of the upstream metal strip and/or for the trailing end of the downstream metal strip. It can thus be effective to provide a lifter for the leading end of the upstream metal strip upstream of the welding heads so that the leading end of the upstream metal strip can be placed on the trailing end of the (leading) downstream metal strip. Optionally or additionally a (downstream) lifter can be provided that is downstream of the welding heads and with which the trailing end of the downstream metal strip can be raised so that it can be placed on the leading end of the (trailing) upstream metal strip. These lifters can be transfer tables that can be raised or pivoted and integrated into the base platform or the base table. In this manner there is a very flexible possibility of optionally establishing in which arrangement the metal strips are to be placed one above the other or one beneath the other. This can be expedient in particular when strips of different thickness are to be spliced to one another. The table or tables can be held in the normal position by a spring element or several spring elements and actuated via one or more actuators, for example cylinder-piston arrangements.

As already described, one or more strip clamps are provided, for example an upstream strip clamp and a downstream strip clamp. According to a further proposal the (upstream) strip clamp, which preferably fixes only the upstream strip, can be moved transversely of the strip-travel direction by means of one or more actuators, in order in particular to position, for example to center, the leading end of the upstream metal strip relative to the trailing end of the downstream metal strip in a desired manner. Optionally, the downstream strip clamp can also be moveable, which then preferably grips only the downstream strip so that the trailing end can be positioned therewith relative to the leading end.

Furthermore, the invention proposes that the apparatus according to the invention has at least one sander with at least one sanding head for sanding a spot weld. This sander can also have an aspirator. It can be useful thereby to assign a respective sanding head to each welding head, the sanding heads being offset to the respective welding heads by a predetermined spacing transversely of the strip-travel direction. The offset of each sanding head to the respective welding head can be adjustable and preferably correspond approximately to the spacing of the spot welds to be made. Consequently, sanding heads are preferably used that work on the strip weld in a perpendicular manner, that is, the rotational axis of the sanding heads is perpendicular to the strips. The aspirator can then be formed, for example, by a pipe with suction surrounding the respective sanding head concentrically with a rubber seal or rubber lip that can be placed on the strip on the end on the pipe. In this embodiment, consequently a sanding operation is preferably carried out only where the spot welds are also provided and where consequently burr formation can occur. However, alternatively other sanders can also be used, for example a sanding brush that moves transversely of the strip-travel direction over the strip weld.

The apparatus according to the invention is furthermore equipped with the necessary actuators and a suitable controller, for example control electronic system. Furthermore, it is expedient when positioners or position sensors are provided that in particular detect the leading end and the trailing end in order to subsequently stop the strips in the desired positions. The strip position of the trailing end and of the leading end is thereby detected, for example with optical sensors. Not only the position along the direction of travel of the strip can be detected thereby, but also the position transverse to the strip-travel direction, in order in particular to realize a positioning of the leading end to the trailing end, for example a centering by means of the described strip clamp.

If not only several spot welds are to be provided offset transversely of the strip-travel direction, but also several spot welds or rows of spot welds are to be made offset one downstream of the other, it can be expedient if the welder or the machine frame (in total) can be moved along the strip-travel direction. To this end, the machine frame, for example, can be guided over guide rollers or comparable guide means in or on guide rails. Furthermore, a suitable actuator for moving is then provided, for example a hydraulic cylinder-piston actuator.

BRIEF DESCRIPTION OF THE DRAWING

The above and other objects, features, and advantages will become more readily apparent from the following description, reference being made to the accompanying drawing in which.

SPECIFIC DESCRIPTION

Figure 7:
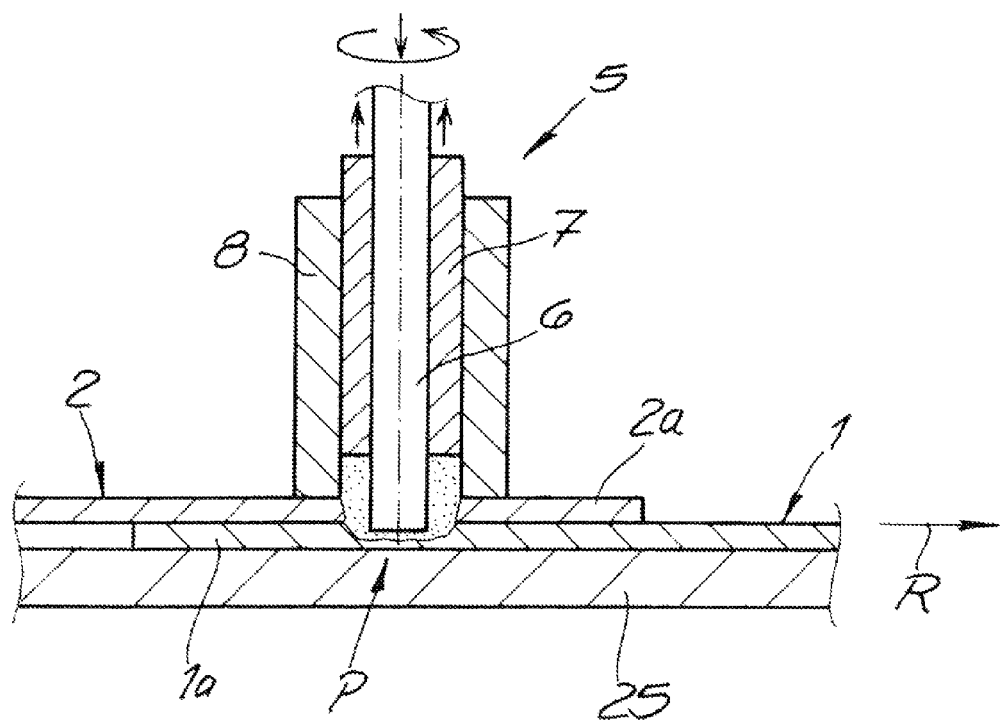
FIG. 7 is a diagrammatically simplified view of a welding head for friction spot welding.

As seen in the drawing, an apparatus for splicing a trailing end 1a of a downstream metal strip 1 to the leading end 2a of an upstream metal strip 2. An apparatus of this type is preferably integrated into the intake of a strip-processing system. In a strip-processing system of this type, also referred to as a strip process line, coiled metal strips are unwound at the intake, then run through different processing stations and at the outlet are then wound up again or further processed in another way, for example cut to form sheet-metal plates. The leading end 2a of a fresh coil is spliced to the trailing end 1a of the preceding coil so that the strips do not always have to be rethreaded. This is carried out within the scope of the invention by spot welds in that the trailing end 1a and the leading end 2a are positioned one above the other so that they overlap and are welded to one another at several spot welds where they overlap. The strips are at rest, that is, the strip transport is stopped during welding. According to the invention, these spot welds are created by friction spot welding. To this end the apparatus according to the invention has a machine frame 3 with a cross bar 4 extending transversely of the strip-travel direction R across the metal strips and on which several friction spot-welding heads 5 are mounted. The mode of operation of a friction spot-welding head of this type is known. It is shown diagrammatically in FIG. 7. Each friction spot-welding head 5 has a pin 6 or a pin-like projection that is rotated and a sleeve 7 that is also rotated, this rotating sleeve 7 being surrounded by a further non-rotating sleeve 8. The pin 6 and the sleeve 7 can be displaced axially in opposite directions to one another. Friction spot welding is basically known and is described, for example, in DE 199 55 737.

Figure 2:
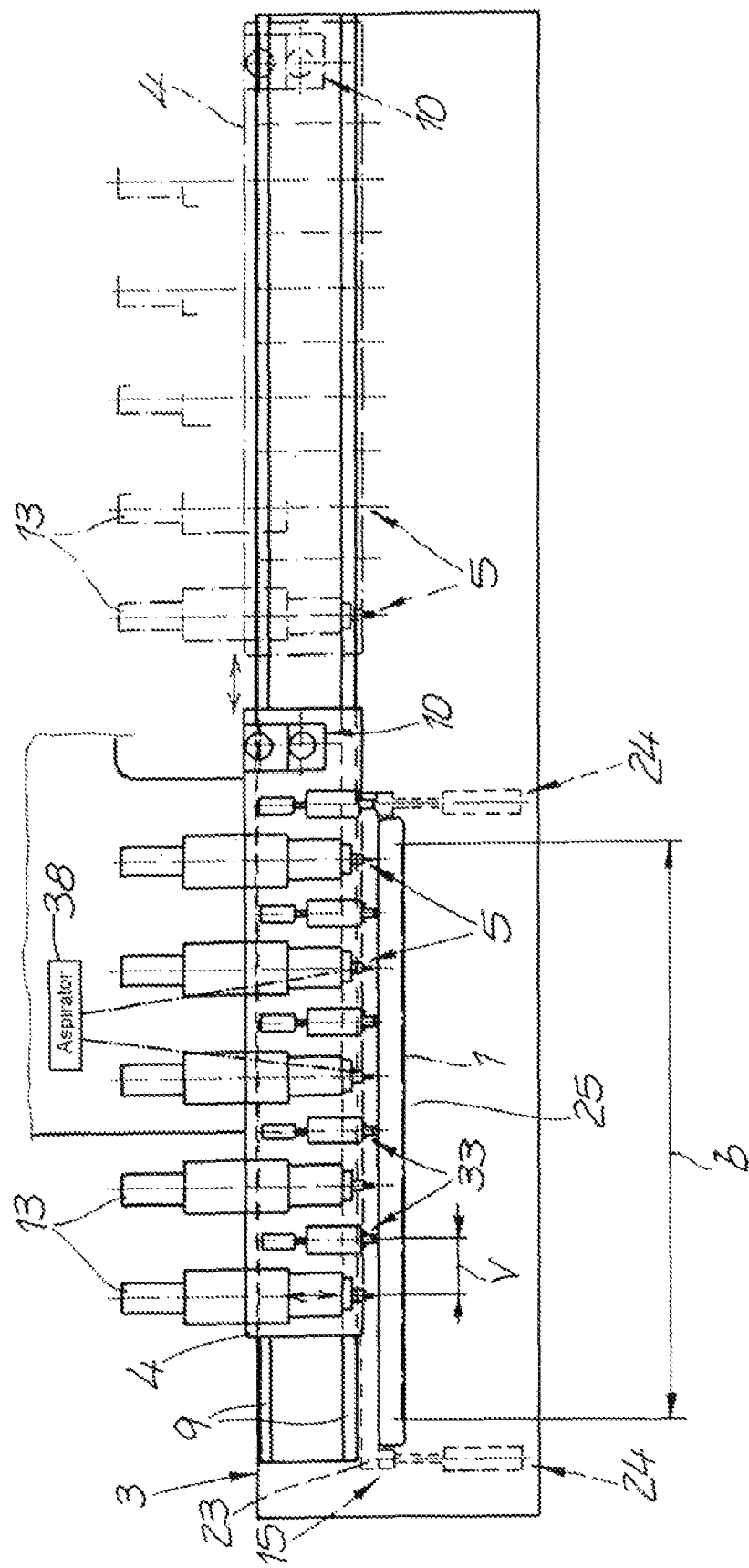
FIG. 2 is view in the direction of arrow II of the subject matter of claim 1.

The cross bar 4 is attached to the machine frame 3 so it can move transversely of the strip-travel direction, namely on guide rails or (horizontal) straight guides 9 and by means of a suitable drive 10 that in the illustrated embodiment is an electric motor that acts on a gear rack 11 via a drive pinion. With the aid of this drive, the cross bar 4 with the welding heads 5 mounted on it can be shifted for appropriate positioning of the welding heads 5 transversely of the strip-travel direction R. Otherwise, FIG. 2 shows that the machine frame 3 is designed such that the entire cross bar 4 with the welding heads 5 can be moved out of the line in order, for example, to switch out a tool.

In order to bring the welding heads 5 from a normal position into a ready or welding position, the welding heads are mounted on the cross bar 4 so as to be vertically shiftable. To this end, the welding heads 5 are mounted on welding-head mounts 12 that are vertically movable on suitable guides by means of respective actuators 13. In the illustrated embodiment these actuators 13 are cylinder-piston arrangements, for example pneumatic cylinders. In the (upper) normal position shown in FIG. 1, the illustrated metal strip that is under tension during the operation of the strip-processing system, can run freely through the installation. If a spot weld is to be produced, the untensioned strips are positioned and then the welding heads are lowered with the actuators 13 into the ready position for the welding operation. In the course of welding as described with reference to in FIG. 7 the head of the welder itself or the components (sleeve, pin) thereof are moved with controlled force by the control drive 37. Consequently, further suitable drives, in particular also for the rotation of the sleeve and/or pin, are provided that, however, can be part of the known welder and therefore are not described in further detail. During welding, the strips (that is, the trailing end and the leading end) are in the rest position and not under tension, that is, they lie on a table 25 of the welder that during welding also supports or braces the welding heads.

Figure 1:
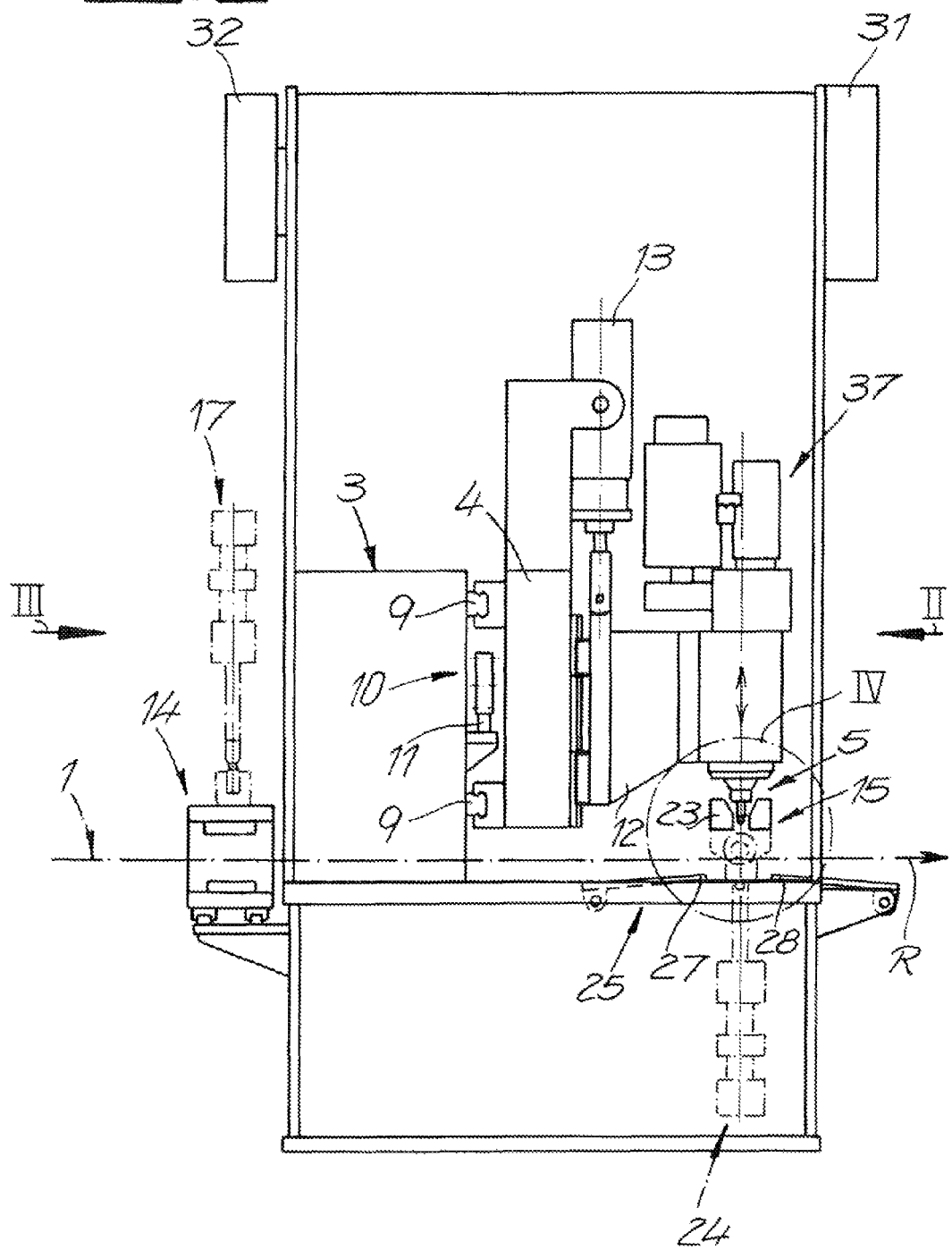
FIG. 1 is a simplified side view of an apparatus according to the invention for splicing metal strips.
Figure 3:
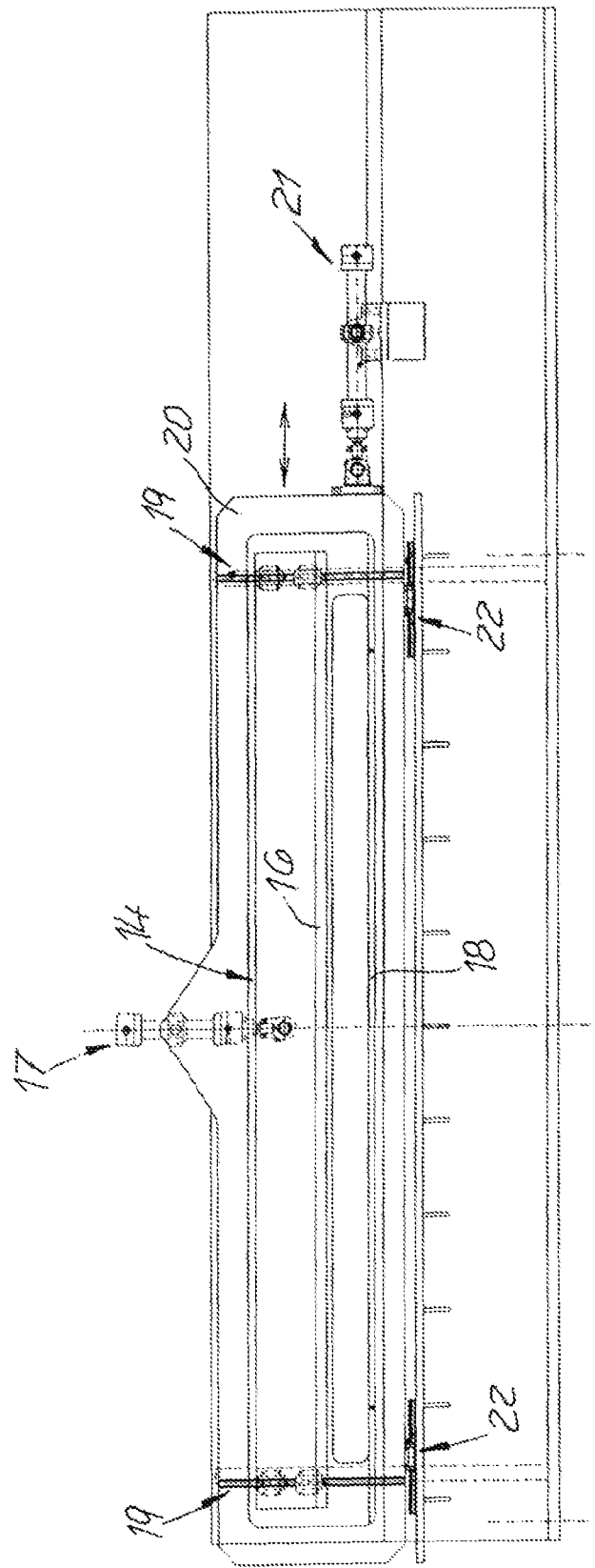
FIG. 3 is a section through FIG. 1 taken in the direction of arrow III.
Figure 4:
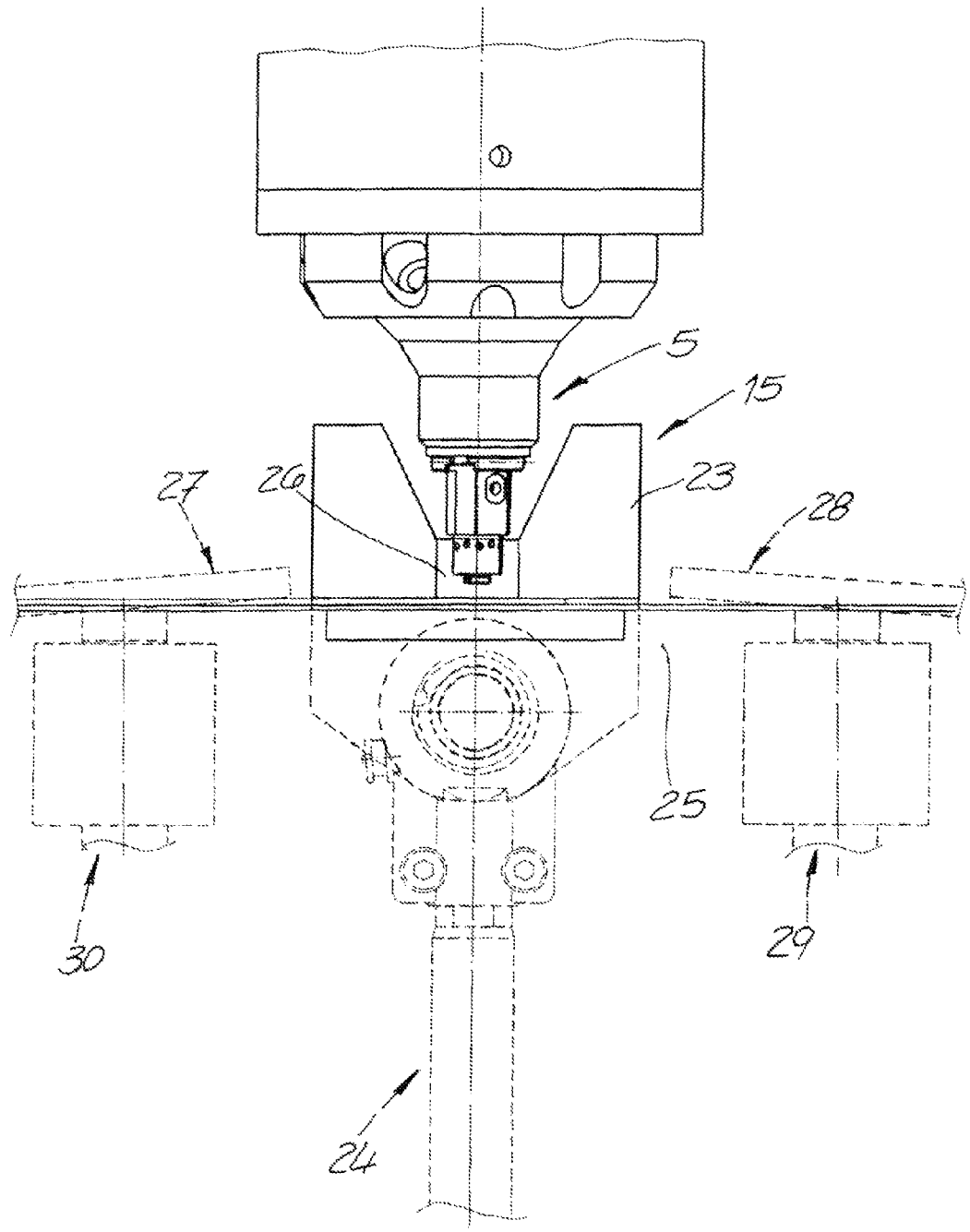
FIG. 4 is a view of the detail indicated at IV in FIG. 1, FIG. 5. shows a modified embodiment of the invention as shown in FIG. 1.

Within the scope of the invention, a suitable fixing and positioning of the strips 1 and 2 in the overlapping region is also particularly important. To this end, an upstream strip clamp 14 and a downstream strip clamp 15 are provided. The upstream strip clamp 14 is upstream of the welding heads 5 in the strip-travel direction. This is shown in FIG. 1 and in more detail in FIG. 3. The upstream strip clamp 14 has an upper clamping beam 16 moved by a clamp actuator 17 against a fixed clamping beam 18. To this end, the beam 16 running transversely of the strip-travel direction is guided on straight vertical guides 19. The actuator 17 is in this embodiment a cylinder piston arrangement (for example hydraulic cylinders) spliced to the beam 16. The (trailing) upstream strip 2 can be fixed with this upstream strip clamp 14. In order to be able to position, for example to center, the leading end 2a of this upstream strip 2 relative to the trailing end 1a of the downstream strip 1, in the illustrated embodiment according to FIG. 3 the strip clamp 14 can be moved transversely of the strip-travel direction. To this end, the clamping beams described are integrated into a frame 20 that can be moved as a whole with a actuator 21, here a hydraulic cylinder, transversely of the strip-travel direction (in the horizontal direction). The frame 20 is guided on straight guides 22 for this purpose (see FIG. 3).

The structure of the downstream strip clamp 15 differs from the structure of the upstream strip clamp 14 in the illustrated embodiment. To this end, we refer in particular to a comparison of FIGS. 1 through 4, where in FIG. 2 the strip clamp 14 is shown only by dashed lines. The drawing shows that the downstream strip clamp 15 is provided close to the welding heads 5 and consequently relative to the strip-travel direction R level with the welding heads 5. This strip clamp 15 consequently fixes not only the trailing end 1a of the downstream strip 1, but also the leading end 2a of the upstream strip 2. This strip clamp 15 has a clamping beam or bar 23 that extends across the overlapping region transversely of the strip-travel direction R and can be shifted by two cylinder-piston arrangements 24 mounted on both sides of the strip. To this end, the cylinder-piston arrangements 24 draw the clamping beam 23 downward, so that the strips are fixed on the table

25 of the apparatus. The fact that the overlapping strips are both clamped prevents the strips 1 and 2 from relatively shifting during the welding process. The clamping beam 23 is thereby designed such that the welding heads 5 can extend through a window 26 of the clamping beam 23 in order to engage the strip surface of the strip lying on top in this manner and consequently to make the spot weld P. This consequently ensures that the strip clamp 15 does not impede the welding process, and nevertheless a faultless fixing of the strips 1 and 2 exactly in the welding region is ensured. Optionally, however, the downstream strip clamp can also be like the upstream strip clamp and then mounted at a predetermined spacing downstream of the welder. It then clamps only the downstream strip so that it is optionally possible to position, for example to center, the trailing end of the downstream strip relative to the leading end of the upstream strip. This possibility is not shown in the figures.

Furthermore, FIG. 2 in particular shows that several sanders 33 are provided that can smooth out the spot welds P. To this end, the welders 33 are equipped with aspirators shown schematically at 38. There is one sanding head 33 for each welding head 5, and the sanding heads 33 are offset to the respective welding heads 5 by a predetermined spacing V transversely of the strip-travel direction. Preferably the offset V of the sanding head 33 to the respective welding head 5 corresponds approximately to the spacing of the spot welds to be made. FIG. 2 consequently makes it clear that after the five spot welds P have been produced in a certain position the entire cross bar 4 is moved through a short stroke transversely to the strip-travel direction that corresponds approximately to the offset V, so that then subsequently the next spot welds P can be produced and the previously produced spot welds P are sanded at the same time or offset in terms of time.

Figure 5:
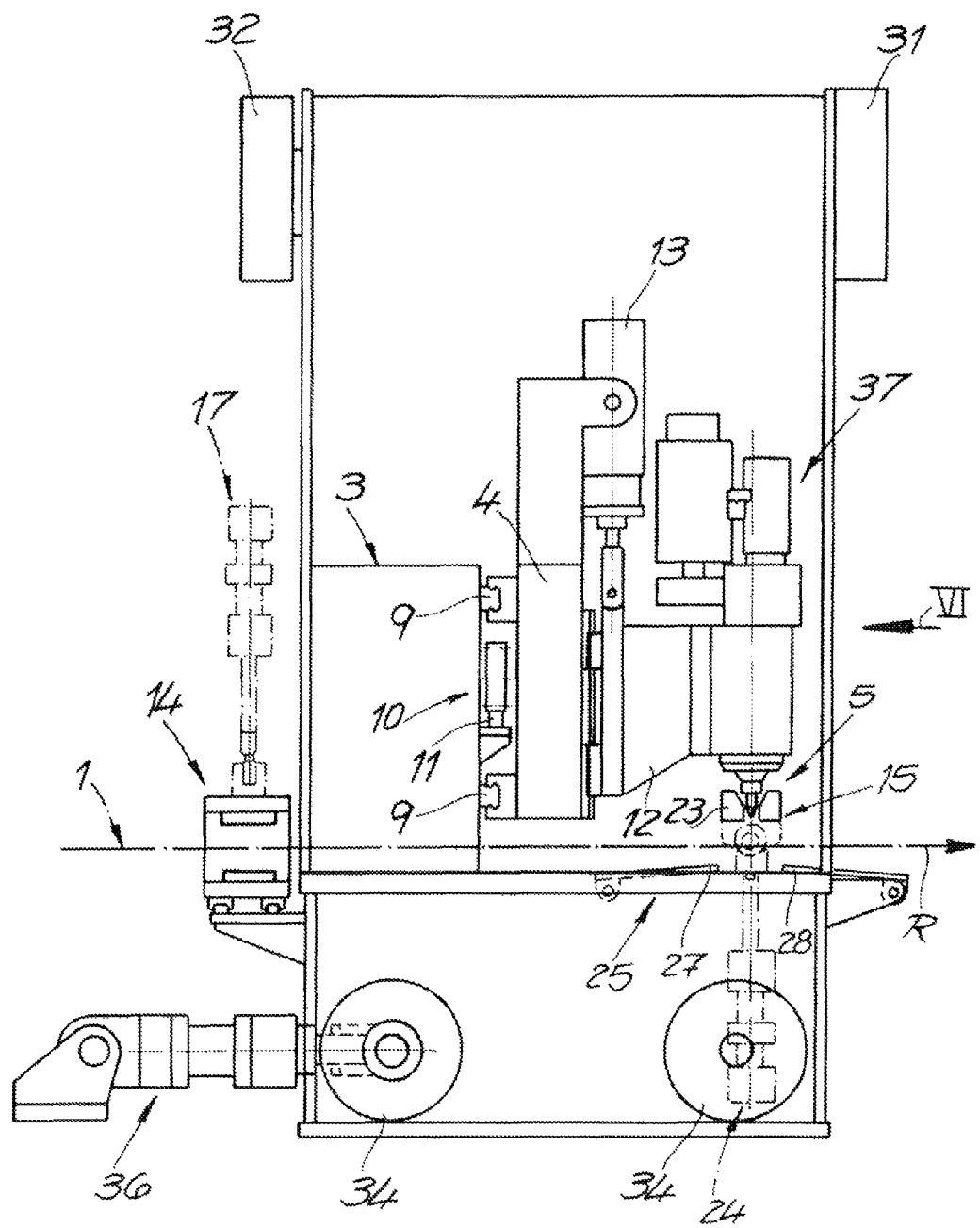
Figure 6:
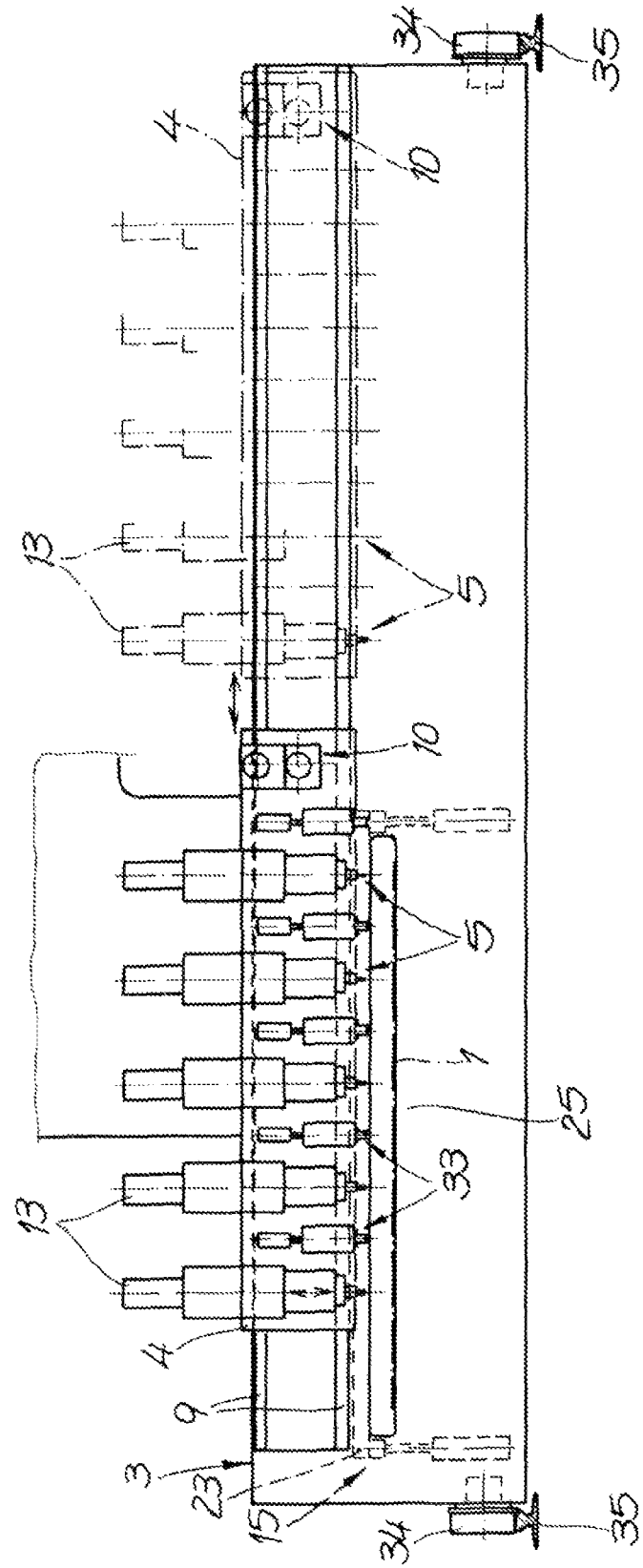
FIG. 6 is a side view taken in the direction of arrow VI of FIG. 5.

FIGS. 1 through 4 relate to a first embodiment in which preferably several spot welds P are produced offset transversely of the strip-travel direction R, but in only one single row of spot welds. Optionally in FIGS. 5 and 6 a modified embodiment of the invention is shown in which the welding heads 5 can also be moved in the strip-travel direction R. To this end, the entire machine frame 3 can be moved in the strip-travel direction R. FIGS. 5 and 6 show that the machine frame is guided over guide rollers 34 on guide rails 35 and connected to a actuator 36. This actuator 36 is also as a hydraulic cylinder. With this multiple-row welding, after completion of the first welded seam row the strip clamps are opened and the entire welder is moved by the spacing of two welded seam rows.

Otherwise, the apparatus according to the invention is equipped with a suitable controller that in particular also stores a database of the welding parameters and a preselectable spot pattern. Details are not shown

We claim:

1. In a strip-treatment installation where a leading end of an upstream strip must be joined to a trailing end of a downstream strip, and where the strips are conveyed in a horizontal strip-travel direction and arrested where the leading end of the upstream strip is overlapped with the trailing end of the downstream strip in the strip travel direction, a splicing apparatus comprising:
    an upstream clamp vertically engageable with the upstream strip and horizontally shiftable transversely of the direction;
    a separate downstream clamp vertically engageable with the downstream strip and horizontally shiftable transversely of the direction;
    means connected to the clamps for clamping the strips and fixing the overlapping ends relative to each other;
    an actuator braced against one of the clamps and operable to shift same relative to the other horizontally and transversely of the direction with the ends overlapped to center the respective strip on the other strip; and
    at least one friction-welding head for forming a plurality of friction spot welds between the overlapping and centered ends.

2. The splicing apparatus defined in claim 1 wherein the apparatus has a frame having a crossbar extending transversely across and above the overlapped strips ends, the head being mounted on the crossbar.

3. In a strip-treatment installation where a leading end of an upstream strip must be joined to a trailing end of a downstream strip, a splicing apparatus comprising:
    means for overlapping the leading end of the upstream strip with the trailing end of the downstream strip;
    a crossbar extending transversely across and above the overlapped strips ends;
    an upstream clamp engageable with the upstream strip;
    a separate downstream clamp engageable with the downstream strip;
    means connected to the clamps for clamping the strips and fixing the overlapping ends relative to each other; and
    a plurality of friction-welding heads mounted on the crossbar and spaced apart transversely of a strip-travel direction for forming a plurality of friction spot welds between the overlapping ends.

4. The splicing apparatus defined in claim 3, further comprising
    means for raising and lowering the heads by raising and lowering the crossbar or by raising and lowering the heads relative to a stationary crossbar.

5. The splicing apparatus defined in claim 3 further comprising
    means for transversely shifting the crossbar between succeeding welding operations, whereby staggered rows of spot welds can be formed on the overlapping ends.

6. The splicing apparatus defined in claim 1 wherein the head includes
    a rod having an end engageable with the overlapped strip ends and rotating in one direction;
    an inner sleeve surrounding the rod, having an end engageable with the overlapped strip ends around the rod end, and rotating in an opposite direction; and
    an outer sleeve surrounding the inner sleeve and having an end engageable with the overlapped strips ends around the inner sleeve end; and
    means for pressing the rod and sleeve ends against the overlapped strip ends.

7. In a strip-treatment installation where a leading end of an upstream strip must be joined to a trailing end of a downstream strip, a splicing apparatus comprising:
    means for overlapping the leading end of the upstream strip with the trailing end of the downstream strip;
    an upstream clamp engageable with the upstream strip;
    a separate downstream clamp engageable with the downstream strip;
    means connected to the clamps for clamping the strips and fixing the overlapping ends relative to each other; and
    at least one friction-welding head for forming a plurality of friction spot welds between the overlapping ends a rod having an end engageable with the overlapped strip ends and rotating in one direction, the head having
        an inner sleeve surrounding the rod, having an end engageable with the overlapped strip ends around the rod end, and rotating in an opposite direction, an outer sleeve surrounding the inner sleeve and having an end engageable with the overlapped strips ends around the inner sleeve end, and means for pressing the rod and sleeve ends against the overlapped strip ends and for retracting the inner sleeve away from the overlapped strip ends after engagement of the rod and sleeve ends with the overlapped strip ends while pressing the rod end and outer-sleeve end against the overlapped strip ends, whereby as the rod sinks into the overlapped ends molten material rises in a space made by retraction of the inner sleeve.

8. In a strip-treatment installation where a leading end of an upstream strip must be joined to a trailing end of a downstream strip, a splicing apparatus comprising:

means for overlapping the leading end of the upstream strip with the trailing end of the downstream strip;

an upstream clamp engageable with the upstream strip;

a separate downstream clamp engageable with the downstream strip;

a clamp bar engageable with the overlapped ends and formed with a window;

means connected to the clamp bar for clamping the strips and fixing the overlapping ends relative to each other; and at least one friction-welding head engageable through the window for forming a plurality of friction spot welds between the overlapping ends.

9. The splicing apparatus defined in claim 1, wherein the overlapping means included means for raising one of the strips relative to the other of the strips and then shifting the strips toward each other.

10. The splicing apparatus defined in claim 1, further comprising sanding means for sanding the spot welds; and aspirating means for cleaning particles generated by sanding from the strips.

11. In a strip-treatment installation where a leading end of an upstream strip must be joined to a trailing end of a downstream strip, a splicing apparatus comprising:

means for overlapping the leading end of the upstream strip with the trailing end of the downstream strip;

an upstream clamp engageable with the upstream strip;

a separate downstream clamp engageable with the downstream strip;

means connected to the clamps for clamping the strips and fixing the overlapping ends relative to each other;

a plurality of friction-welding heads for forming a plurality of friction spot welds between the overlapping ends;

sanding means including respective sanding heads for the friction-welding heads for sanding the spot welds, the sanding heads being offset transversely and longitudinally from the respective welding heads; and aspirating means for cleaning particles generated by sanding from the strips.

* * * * *